United States Patent
Matsumoto et al.

(10) Patent No.: US 9,475,923 B2
(45) Date of Patent: Oct. 25, 2016

(54) RUBBER COMPOSITION, RUBBER ELASTOMER, TIRE AND BLOCK COPOLYMER

(71) Applicant: JSR CORPORATION, Minato-ku (JP)

(72) Inventors: Takaomi Matsumoto, Tokyo (JP); Ryoji Tanaka, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 34 days.

(21) Appl. No.: 14/361,947

(22) PCT Filed: Nov. 29, 2012

(86) PCT No.: PCT/JP2012/080937
§ 371 (c)(1),
(2) Date: May 30, 2014

(87) PCT Pub. No.: WO2013/081053
PCT Pub. Date: Jun. 6, 2013

(65) Prior Publication Data
US 2014/0357759 A1 Dec. 4, 2014

(30) Foreign Application Priority Data
Dec. 1, 2011 (JP) ................. 2011-263606

(51) Int. Cl.
| | |
|---|---|
| C08L 21/00 | (2006.01) |
| C08L 53/02 | (2006.01) |
| C08L 9/00 | (2006.01) |
| C08L 47/00 | (2006.01) |
| C08L 51/04 | (2006.01) |
| C08L 91/00 | (2006.01) |
| C08K 3/00 | (2006.01) |
| B60C 1/00 | (2006.01) |
| C08F 8/00 | (2006.01) |
| C08F 297/04 | (2006.01) |

(52) U.S. Cl.
CPC ............... *C08L 9/00* (2013.01); *B60C 1/0016* (2013.04); *B60C 1/0025* (2013.04); *C08F 8/00* (2013.01); *C08F 297/04* (2013.01); *C08F 297/046* (2013.01); *C08K 3/0033* (2013.01); *C08L 21/00* (2013.01); *C08L 47/00* (2013.01); *C08L 51/04* (2013.01); *C08L 53/02* (2013.01); *C08L 91/00* (2013.01)

(58) Field of Classification Search
CPC .......... C08L 21/00; C08L 53/02; C08L 9/00; C08L 47/00; C08L 51/04; C08L 91/00; C08K 3/0033; B60C 1/0016; B60C 1/0025; C08F 8/00; C08F 297/04; C08F 297/046
USPC .......................................................... 523/156
See application file for complete search history.

(56) References Cited

U.S. PATENT DOCUMENTS

| | | |
|---|---|---|
| 5,206,301 A | 4/1993 | Hattori et al. |
| 2004/0132907 A1 | 7/2004 | Nakamura et al. |
| 2005/0171276 A1 | 8/2005 | Matsuda et al. |
| 2006/0148994 A1 | 7/2006 | Lesage |
| 2009/0124730 A1 | 5/2009 | Matsuda et al. |
| 2010/0130671 A1 | 5/2010 | Tadaki et al. |
| 2010/0292406 A1 | 11/2010 | Herzog et al. |

FOREIGN PATENT DOCUMENTS

| | | |
|---|---|---|
| EP | 0 396 780 A1 | 11/1990 |
| EP | 1 398 349 A1 | 3/2004 |
| EP | 2 123 687 A1 | 11/2009 |
| JP | 2001-098116 | 4/2001 |
| JP | 2006-124472 | 5/2006 |
| JP | 2008-231197 | 10/2008 |
| JP | 2008-231207 | 10/2008 |
| JP | 2008-231208 | 10/2008 |
| JP | 2011-006543 | 1/2011 |
| JP | 2011-523666 A | 8/2011 |
| WO | 03/085010 | 10/2003 |
| WO | WO 2004/099278 A1 | 11/2004 |

OTHER PUBLICATIONS

Machine Translation of JP 2008 231207.*
Combined Chinese Office Action and Search Report issued Nov. 23, 2015 in Patent Application No. 201280058761.1 (with English language translation).
International Search Report Issued Feb. 26, 2013 in PCT/JP12/080937 filed Nov. 29, 2012.
Extended European Search Report issued Jun. 9, 2015 in Patent Application No. 12854248.7.
Office Action drafted Oct. 26, 2015 in Japanese Patent Application No. 2013-547212 (with partial English translation).

* cited by examiner

*Primary Examiner* — Angela C Scott
(74) *Attorney, Agent, or Firm* — Oblon, McClelland, Maier & Neustadt, L.L.P.

(57) ABSTRACT

A rubber composition by which a rubber elastic body having both of excellent low rolling resistance and wet skid resistance and also having excellent mechanical strength and wear resistance can be obtained, a rubber elastic body, a tire, and a block copolymer are provided. The rubber composition of the present invention comprises a block copolymer (A) comprising a block (a-1) of a conjugate diene and an aromatic vinyl and a block (a-2) of a conjugate diene or the diene and an aromatic vinyl, a specific polymer (B) other than the copolymer, and a filler (C), wherein the block copolymer (A) has a specific functional group; the block copolymer (A) has two glass transition temperatures separated from each other by 5° C. or more within a range of −100 to 20° C. in measurement in accordance with ASTM D3418; and the ratio of the block copolymer (A) is 10% by mass or more when the sum of the block copolymer (A) and the polymer (B) is taken as 100% by mass.

14 Claims, No Drawings

RUBBER COMPOSITION, RUBBER ELASTOMER, TIRE AND BLOCK COPOLYMER

CROSS REFERENCE TO RELATED APPLICATIONS

The present application is a 35 U.S.C. §371 national stage patent application of International patent application PCT/JP2012/080937, filed on Nov. 29, 2012, published as WO/2013/081053 on Jun. 6, 2013, the text of which is incorporated by reference, and claims the benefit of the filing date of Japanese application no. 2011-263606, filed on Dec. 1, 2011, the text of which is also incorporated by reference.

TECHNICAL FIELD

The present invention relates to a rubber composition suitable for tire tread use, a rubber elastic body obtained from the rubber composition, and a tire having a tread formed from the rubber elastic body, and a block copolymer for use in the rubber composition.

BACKGROUND ART

Recently, with an increase in social request for energy saving, a requirement for reducing fuel consumption of automobiles has become more severe. For coping with such a requirement, further reduction of rolling resistance has been demanded with regard to tire performance. As a method for lowering the tire rolling resistance, besides a method for optimizing a tire structure, a method of using less heat-generating one as a rubber elastic body constituting the tread has been most commonly investigated.

For obtaining such a less heat-generating rubber elastic body, a rubber composition using silica or carbon black as a filler has hitherto been investigated. As such a rubber elastic body, for example, there has been proposed one containing a modified conjugated diene polymer, in which a polymerization active end of a conjugated diene polymer obtained by anionic polymerization with using an organolithium compound is modified with a compound containing a functional group that interacts with the filler, as a rubber component (see Patent Document 1).

On the other hand, as a rubber composition providing a rubber elastic body having good balance between low rolling resistance and wet skid resistance, there has been proposed one comprising carbon black and a modified block copolymer comprising a polymer block having a high glass transition temperature and a polymer block having a low glass transition temperature, in which an end of the polymer block having a low glass transition temperature is modified with a compound containing a functional group (see Patent Document 2).

However, in the above rubber composition, there is a problem that the filler to be used is limited to carbon black and a rubber elastic body having both of excellent low rolling resistance and wet skid resistance is not obtained although a balance between low rolling resistance and wet skid resistance is improved.

Moreover, although there has been proposed a rubber composition providing a rubber elastic body having an excellent balance between low rolling resistance and wet skid resistance in the case where silica is used as a filler, further improvement has been required.

BACKGROUND ART DOCUMENTS

Patent Documents

Patent Document 1: JP-A-2006-124472
Patent Document 2: JP-A-2001-98116

SUMMARY OF THE INVENTION

Problems to be Solved by the Invention

The present invention has been made on the basis of the circumstances as described above and an object thereof is to provide a rubber composition providing g a rubber elastic body having both of excellent low rolling resistance and wet skid resistance and also having excellent mechanical strength and wear resistance even when any of silica and carbon black is used as a filler, and a block copolymer for use in the rubber composition.

Another object of the present invention is to provide a rubber elastic body having both of excellent low rolling resistance and wet skid resistance and also having excellent mechanical strength and wear resistance and a tire having a tread formed from the rubber elastic body.

Means for Solving the Problems

A rubber composition of the present invention comprises:
a block copolymer (A) comprising a polymer block (a-1) comprising a structural unit derived from a conjugate diene compound and a structural unit derived from an aromatic vinyl compound and a polymer block (a-2) comprising a structural unit derived from a conjugate diene compound; or a structural unit derived from a conjugate diene compound and a structural unit derived from an aromatic vinyl compound, at least one polymer (B) selected from natural rubber, isoprene rubber, butadiene rubber, a styrene-butadiene rubber other than the above block copolymer (A), an ethylene-α-olefin copolymer rubber, an ethylene-α-olefin-diene copolymer rubber, an acrylonitrile-butadiene copolymer rubber, chloroprene rubber, and a halogenated butyl rubber, and at least one filler (C) selected from silica and carbon black, wherein the block copolymer (A) has at least one functional group selected from the group consisting of an amino group, an imino group, a pyridyl group, a piperazyl group, and a thiol group or a functional group obtained by subjecting each of these functional groups to onium salt formation, a hydrocarbyloxysilyl group, or a silanol group;

the block copolymer (A) has two glass transition temperatures separated from each other by 5° C. or more within a range of −100 to 20° C. by measurement in accordance with ASTM D3418; and the ratio of the block copolymer (A) is 10% by mass or more when the sum of the block copolymer (A) and the polymer (B) is taken as 100% by mass.

In the rubber composition of the present invention, it is preferable that of the two glass transition temperatures in the block copolymer (A), one is a glass transition temperature of the polymer block (a-1) and the other one is a glass transition temperature of the polymer block (a-2) and the glass transition temperature of the polymer block (a-1) is from −60 to 20° C. and the glass transition temperature of the polymer block (a-2) is from −100 to −30° C.

Additionally, it is preferable that in the polymer block (a-1), the ratio of the structural unit derived from an aromatic vinyl compound in the total structural units is 20% by mass or more.

Additionally, in the rubber composition of the present invention, it is preferable that the block copolymer (A) is obtained by, in a hydrocarbon solvent, subjecting a conjugated diene compound and an aromatic vinyl compound to living anionic polymerization with using at least one compound selected from the group consisting of organic alkali metals and organic alkaline earth metals as an initiator to synthesize a prepolymer having an active end; subjecting a conjugated diene compound or a conjugated diene compound and an aromatic vinyl compound to living anionic polymerization with using the active end of the prepolymer as a polymerization initiation point to synthesize an unmodified block copolymer having an active end; and reacting the active end of the unmodified block copolymer with a hydrocarbyloxysilane having at least one functional group selected from the group consisting of an amino group, an imino group, a pyridyl group, a piperazyl group, and a thiol group.

Additionally, in the rubber composition of the present invention, it is preferable that the block copolymer (A) is obtained by, in a hydrocarbon solvent, subjecting a conjugated diene compound and an aromatic vinyl compound to living anionic polymerization with using at least one compound selected from the group consisting of organic alkali metals and organic alkaline earth metals as an initiator to synthesize a prepolymer having an active end; subjecting a conjugated diene compound or a conjugated diene compound and an aromatic vinyl compound to living anionic polymerization with using the active end of the prepolymer as a polymerization initiation point to synthesize an unmodified block copolymer having an active end; reacting the active end of the unmodified block copolymer with a hydrocarbyloxysilane having at least one functional group selected from the group consisting of an amino group, an imino group, a pyridyl group, a piperazyl group, and a thiol group to synthesize a modified block copolymer; and subjecting the functional group in the modified block copolymer to onium salt formation with an onium-forming agent.

Additionally, in the rubber composition of the present invention preferably comprises a crosslinking agent.

A rubber elastic body of the present invention is obtained by a crosslinking treatment of the rubber composition.

A tire of the present invention has a tread formed from the rubber elastic body.

A block copolymer of the present invention comprises a polymer block (a-1) comprising a structural unit derived from a conjugate diene compound and a structural unit derived from an aromatic vinyl compound and a polymer block (a-2) comprising a structural unit derived from a conjugate diene compound or a structural unit derived from a conjugate diene compound and a structural unit derived from an aromatic vinyl compound, wherein the block copolymer has at least one functional group selected from the group consisting of an amino group, an imino group, a pyridyl group, a piperazyl group, and a thiol group or a functional group obtained by subjecting each of these functional groups to onium salt formation, a hydrocarbyloxysilyl group, or a silanol group; and the block copolymer has two glass transition temperatures separated from each other by 5° C. or more within a range of −100 to 20° C. in measurement with ASTM D3418.

In the block copolymer of the present invention, it is preferable that of the two glass transition temperatures, one is a transition temperature of the polymer block (a-1) and the other one is a transition temperature of the polymer block (a-2) and the transition temperature of the polymer block (a-1) is from −60 to 20° C. and the transition temperature of the polymer block (a-2) is from −100 to −30° C.

Effect of Invention

According to the rubber composition of the present invention, since the block copolymer (A) and the polymer (B) are contained as rubber components, even when any of silica and carbon black is used as a filler, it becomes possible for the filler to present not only in the polymer (A) but also in the polymer (B) and hence a more homogeneous rubber composition can be obtained. As a result, a rubber elastic body having both of excellent low rolling resistance and wet skid resistance and also having excellent mechanical strength and wear resistance can be obtained.

MODES FOR CARRYING OUT THE INVENTION

Modes for carrying out the present invention will be described below.

In the rubber composition of the present invention, a specific block copolymer (A) and a polymer (B) other than the specific block copolymer (A) are contained, at least one selected from silica and carbon black is contained as a filler (C), and, for example, in the case of producing a rubber elastic body constituting a tire tread, a crosslinking agent is usually contained.

<Block Copolymer (A)>

The block copolymer (A) to be contained as a rubber component in the rubber composition of the present invention comprises a polymer block (a-1) comprising a structural unit derived from a conjugate diene compound and a structural unit derived from an aromatic vinyl compound and a polymer block (a-2) comprising a structural unit derived from a conjugate diene compound; or a structural unit derived from a conjugate diene compound and a structural unit derived from an aromatic vinyl compound.

As the conjugate diene compound, 1,3-butadiene, isoprene, 1,3-pentadiene, 2,3-dimethyl-1,3-butadiene, 2-phenyl-1,3-butadiene, 1,3-hexadiene, and the like may be used either alone or as a combination of two or more thereof. Of these, 1,3-butadiene, isoprene, and 2,3-dimethyl-1,3-butadiene are preferable.

Also, as the aromatic vinyl compound, styrene, α-methylstyrene, 1-vinylnaphthalene, 3-vinyltoluene, ethylvinylbenzene, divinylbenzene, 4-cyclohexylstyrene, 2,4,6-trimethylstyrene, tert-butoxydimethylsilylstyrene, isopropoxydimethylsilylstyrene, and the like may be used either alone or as a combination of two or more thereof. Of these, styrene is preferable.

The block copolymer (A) has at least one functional group selected from the group consisting of an amino group, an imino group, a pyridyl group, a piperazyl group, and a thiol group or a functional group obtained by subjecting each of these functional groups to onium salt formation, a hydrocarbyloxysilyl group, or a silanol group (hereinafter, they are referred to as "specific functional groups"). Here, the amino group may be any of a primary amino group, a secondary amino group, and a tertiary amino group. In the rubber composition of the present invention, it is preferable that either one of the polymer block (a-1) and the polymer block (a-2) has the specific functional group, and it is more preferable that the polymer block (a-2) has it.

Examples of methods for introducing the specific functional group into the block copolymer (A) include a method of subjecting a monomer for obtaining the polymer block (a-2) to living anionic polymerization and subsequently terminating the polymerization with using a compound having the specific functional group (hereinafter referred to as a "compound for specific functional group introduction") as a polymerization terminator, a method of copolymerizing a monomer for obtaining the polymer block (a-1) or a monomer for obtaining the polymer block (a-2) with a monomer having the specific functional group (hereinafter referred to as a "monomer for specific functional group introduction") copolymerizable with the above monomer, etc.

Specific examples of the compound for specific functional group introduction include hydrocarbyloxysilanes such as N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N,N'-tris(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxysilane, N4-[2-(trimethoxysilyl)-ethyl]-N,N',N'-trimethylethane-1,2-diamine, 1-[3-(triethoxysilyl)-propyl]-4-methylpiperazine, 1-[3-(trimethoxysilyl)-propyl]-4-methylpiperazine, 1-[3-(triethoxysilyl)-propyl]-4-trimethylsilylpiperazine, 1-[3-(trimethoxysilyl)-propyl]-4-trimethylsilylpiperazine, N-triethoxysilylpropylpyridine, N-trimethoxysilylpropylpyridine, 2-(trimethoxysilyl)-1,3-dimethylimidazolidine, 2-(3-trimethoxysilyl-propyl)-1,3-dimethylimidazolidine, 3-dimethylaminopropyltrimethoxysilane, 3-diethylaminopropyltrimethoxysilane, 3-dimethylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, N-(1,3-dimethylbutylidene)-3-(triethoxysilyl)-1-propanamine, N-(1-methylpropylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, bis-(3-dimethylaminopropyl)-dimethoxysilane, [3-(diethylamino)propyl]trimethoxysilane, [3-(dimethylamino)propyl]triethoxysilane, 1-(4-N,N-dimethylaminophenyl)-1-phenylethylene, S-trimethylsilylmercaptopropylmethyldimethoxysilane, S-trimethylsilylmercaptopropyltrimethoxysilane, S-trimethylsilylmercaptopropyltriethoxysilane, and S-trimethylsilylmercaptopropylmethyldiethoxysilane.

Additionally, specific examples of the monomer for specific functional group introduction include 1-(4-N,N-dimethylaminophenyl)-1-phenylethylene, 1-(4-N,N-diethylaminophenyl)-1-phenylethylene, 1-(4-N,N-dipropylaminophenyl)-1-phenylethylene, 1-(4-N,N-dibutylaminophenyl)-1-phenylethylene, 1-(4-N,N-dimethoxyaminophenyl)-1-phenylethylene, 1-(4-N,N-diethoxyaminophenyl)-1-phenylethylene, 1-(4-N,N-dipropoxyaminophenyl)-1-phenylethylene, 1-(4-N,N-dibutoxyaminophenyl)-1-phenylethylene, and the like.

Moreover, the amino group, the imino group, the pyridyl group, the piperazyl group, and the thiol group may be formed into onium salts by the action of an onium-forming agent.

As such an onium-forming agent, for example, metal halides such as silicon halide compounds, tin halide compounds, aluminum halide compounds, titanium halide compounds, zirconium halide compounds, germanium halide compounds, zinc halide compounds and gallium halide compounds, sulfuric acid esters, phosphoric acid esters, carbonic acid esters, nitric acid esters, carboxylic acids, sulfonic acids, inorganic acids such as hydrofluoric acid, hydrochloric acid, hydrobromic acid, hydroiodic acid, sulfuric acid, nitric acid, carbonic acid and phosphoric acid, inorganic acid salts such as potassium fluoride, tetramethylammonium fluoride and tetra-n-butylammonium fluoride, organic acids such as carboxylic acids and sulfonic acids, and the like are used.

Specific examples of the onium-forming agent include silicon tetrachloride, tin tetrachloride, trimethylsilyl chloride, dimethyldichlorosilane, methyltrichlororsilane, methyldichlorosilane, diethylaluminum chloride, ethylaluminum sesquichloride, ethylaluminum dichloride, titanium tetrachloride, titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerin, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic aicd, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, tetra-n-butylammonium fluoride, and the like.

From the viewpoint of capability of onium formation of a group that may be formed into an onium, these onium-forming agents all have the similar action and can be used in the present invention even when they are not described in Examples to be mentioned later.

The method of bringing the onium-forming agent into contact with water to form an onium structure is not particularly limited and examples thereof include (i) a method wherein polymerization is terminated with using a compound for specific functional group introduction or a monomer for obtaining the polymer block (a-1) or the polymer block (a-2) and a monomer for specific functional group introduction are copolymerized, followed by directly adding water into a polymer solution and mixing the solution and (ii) a method wherein polymerization is terminated with using a compound for specific functional group introduction or a monomer for obtaining the polymer block (a-1) or the polymer block (a-2) and a monomer for specific functional group introduction are copolymerized, followed by adding one obtained by dissolving water in an organic solvent which is able to dissolved in both of water and the organic solvent, such as an alcohol, into a polymer solution and mixing the solution. Moreover, in the method for producing the block copolymer (A), a modified conjugated diene polymer can be collected by known solvent removal (e.g., steam stripping or the like) and drying operations in the production of a conjugated diene polymer. Accordingly, as the method of forming an onium structure, there may be also mentioned (iii) a method wherein polymerization is terminated with using a compound for specific functional group introduction or a monomer for obtaining the polymer block (a-1) or the polymer block (a-2) and a monomer for specific functional group introduction are copolymerized, followed by mixing a polymer solution and/or a polymer with water at the same time of the solvent removal in the steam stripping step. Of these, from the viewpoint of efficient onium structure formation, particularly preferred is (iii) a method wherein polymerization is terminated with using a compound for specific functional group introduction or a monomer for obtaining the polymer block (a-1) or the polymer block (a-2) and a monomer for specific functional group introduction are copolymerized, followed by mixing a polymer solution and/or a polymer with water at the same time of the solvent removal in the steam stripping step.

In the rubber composition of the present invention, the block copolymer (A) has two glass transition temperatures separated from each other by 5° C. or more, preferably from 10° C. or more within a range of −100 to 20° C. in measurement with ASTM D3418.

Of the two glass transition temperatures, one is a transition temperature of the polymer block (a-1) and the other one is a transition temperature of the polymer block (a-2).

The glass transition temperature of the polymer block (a-1) is preferably from −60 to 20° C., more preferably from −50 to 10° C.

The glass transition temperature of the polymer block (a-2) is preferably from −100° C. to −30° C., more preferably from −90 to −40° C.

When the glass transition temperature of the polymer block (a-1) is lower than −60° C., the wet skid resistance is remarkably deteriorated. On the other hand, when the glass transition temperature of the polymer block (a-1) exceeds 20° C., the low hysteresis loss property is remarkably deteriorated.

Also, when the glass transition temperature of the polymer block (a-2) is lower than −100° C., the wet skid resistance is remarkably deteriorated. On the other hand, when the glass transition temperature of the polymer block (a-2) exceeds −30° C., the low hysteresis loss property is remarkably deteriorated.

Moreover, when a difference between the glass transition temperature of the polymer block (a-1) and the glass transition temperature of the polymer block (a-2) is less than 5° C., the low hysteresis loss property and the tensile strength are deteriorated.

The glass transition temperatures of the polymer block (a-1) and the polymer block (a-2) can be controlled by changing the ratio of the structural unit of the aromatic vinyl compound in the total structural units of each block and the content of 1,2-vinyl bonds.

Moreover, the ratio of the structural unit derived from an aromatic vinyl compound in the total structural units of the polymer block (a-1) is preferably from 20 to 60% by mass, more preferably from 25 to 55% by mass. When the ratio is less than 20% by mass, there is a possibility that the fracture characteristic and the wet skid resistance are remarkably deteriorated.

Also, the ratio of the structural unit derived from an aromatic vinyl compound in the total structural units of the polymer block (a-2) is preferably 30% by mass or less, more preferably 25% by mass or less. When the ratio exceeds 30% by mass, the low hysteresis property is deteriorated.

Furthermore, in the block copolymer (A), the content of 1,2-vinyl bonds in the structural unit derived from the conjugated diene compound is preferably from 30 to 70 mol %. When the content of 1,2-vinyl bonds is exceedingly small, there is a possibility that a balance between wet grip performance and rolling resistance in the rubber elastic body obtained from the rubber composition is deteriorated. On the other hand, when the content of 1,2-vinyl bonds is excessively large, there is a possibility that wear resistance of the rubber elastic body obtained from the rubber composition is extremely decreased.

Here, the content of 1,2-vinyl bonds in the structural unit derived from the conjugated diene compound can be calculated from a 500 MHz $^1$H-NMR spectrum.

Furthermore, in the block copolymer (A), it is preferable that the weight average molecular weight of the polymer block (a-1) is from 50,000 to 400,000; the weight average molecular weight of the polymer block (a-2) is from 50,000 to 400,000; and the weight average molecular weight of the whole block copolymer (A) is from 100,000 to 800,000.

In the rubber composition of the present invention, when the sum of the block copolymer (A) and the block copolymer (B) is taken as 100% by mass, the ratio of the block copolymer (A) is preferably from 10% by mass or more, more preferably from 20 to 90% by mass. When the ratio is exceedingly small, the wet skid resistance and the tensile strength are remarkably deteriorated. On the other hand, when the ratio is exceedingly large, the low hydteresis property and the tensile strength are deteriorated.

As a preferable method for producing such a block copolymer (A), the following methods (1) or (2) is mentioned.

(1) A method via the following steps:

a first polymerization step of, in a hydrocarbon solvent, subjecting a conjugated diene compound and an aromatic vinyl compound to living anionic polymerization with using at least one compound selected from the group consisting of organic alkali metals and organic alkaline earth metals as an initiator to synthesize a prepolymer having an active end, a second polymerization step of subjecting a conjugated diene compound or a conjugated diene compound and an aromatic vinyl compound to living anionic polymerization with using the active end of the prepolymer obtained in the first polymerization step as a polymerization initiation point to synthesize an unmodified block copolymer having an active end, and a polymer modification step of reacting the active end of the unmodified block copolymer obtained in the second polymerization step with a polymerization terminator comprising a hydrocarbyloxysilane having at least one functional group selected from the group consisting of an amino group, an imino group, a pyridyl group, a piperazyl group, and a thiol group.

(2) A method via the following steps:

a first polymerization step of, in a hydrocarbon solvent, subjecting a conjugated diene compound and an aromatic vinyl compound to living anionic polymerization with using at least one compound selected from the group consisting of organic alkali metals and organic alkaline earth metals as an initiator to synthesize a prepolymer having an active end, a second polymerization step of subjecting a conjugated diene compound or a conjugated diene compound and an aromatic vinyl compound to living anionic polymerization with using the active end of the prepolymer obtained in the first polymerization step as a polymerization initiation point to synthesize an unmodified block copolymer having an active end, a polymer modification step of reacting the active end of the unmodified block copolymer obtained in the second polymerization step with a polymerization terminator comprising a hydrocarbyloxysilane having at least one functional group selected from the group consisting of an amino group, an imino group, a pyridyl group, a piperazyl group, and a thiol group to synthesize a modified block copolymer, and an onium salt formation step of subjecting the functional group in the modified block copolymer obtained in the polymer modification step to onium salt formation with an onium-forming agent.

Specific examples of the hydrocarbon solvent for use in the above methods (1) and (2) include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. These may be used either alone or as a combination of two or more thereof.

Moreover, the organic alkali metals and organic alkaline earth metals to be used as initiators are not particularly limited and organolithium compounds and lithium amide compounds may be mentioned as preferable examples. In the case where the former organolithium compounds are used, a conjugated diene polymer having a hydrocarbon group at the polymerization initiation end and having a polymerization active site at another end is obtained. In the case where the latter lithium amide compounds are used, a conjugated diene polymer having a nitrogen-containing group at the polymerization initiation end and having a polymerization active site at another end is obtained.

It is preferable that the above organolithium compounds are those having a hydrocarbon group having 1 to 20 carbon atoms and examples thereof include methyllithium, ethyllithium, n-propyllithium, iso-propyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, a reaction product of diisopropenylbenzene and butyllithium, and the like. Of these, n-butyllithium and sec-butyllithium are preferable.

On the other hand, examples of the lithium amide compounds include lithium hexamethyleneimide, lithium pyrrolidide, lithium piperidide, lithium heptamethyleneimide, lithium dodecamethyleneimide, lithium morpholide, lithium dimethylamide, lithium diethylamide, lithium dibutylamide, lithium dipropylamide, lithium diisopropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, and the like. Of these, in view of an interaction effect on carbon black or silica and polymerization initiation capability, cyclic lithium amides such as lithium hexamethyleneimide, lithium pyrrolidide, lithium piperidide, lithium heptamethyleneimide, and lithium dodecamethyleneimide are preferable and particularly, lithium hexamethyleneimide, lithium pyrrolidide, and lithium piperidide are suitable.

As for these lithium amide compounds, although those prepared from a secondary amine and a lithium compound beforehand are generally used as polymerization initiators, the lithium amide compounds may be prepared in the polymerization system (in-situ).

Also, in the above method (1) and (2), in order to regulate the content of 1,2-vinyl bonds in the resulting block copolymer (A), to the reaction system, a vinyl content regulator, e.g., an ether, a tertiary amine, or the like, such as dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, N,N,N',N'-tetramethylethylenediamine, 1,2-dipiperidinoethane, ethylene glycol dibutyl ether, ethylene glycol dimethyl ether, diethyl ether, dioxane, trimethylamine, quinuclidine, potassium t-amylate, potassium t-butylate, triphenylphosphine, tetrahydropyran, dibutyl ether, ethylene glycol diethyl ether, diethylene glycol diethyl ether, diphenyl ether, anisole, tripropylamine, tributylamine, N,N-diethylaniline, and quinoline may be added.

The amount of such a vinyl content regulator to be used is preferably in the range of about 0.005 to 1,000 mol per 1 molar equivalent of the organic alkali metal or the organic alkaline earth metal.

<Polymer (B)>

The polymer (B) to be contained as a rubber component in the rubber composition of the present invention is at least one selected from natural rubber, isoprene rubber, butadiene rubber, a styrene-butadiene rubber other than the above block copolymer (A), an ethylene-α-olefin copolymer rubber, an ethylene-α-olefin-diene copolymer rubber, an acrylonitrile-butadiene copolymer rubber, chloroprene rubber, and a halogenated butyl rubber.

Moreover, it is preferable that the polymer (B) is incompatible with the polymer block (a-1) and is compatible with the polymer block (a-2).

Furthermore, with regard to the polymer (B), it is preferable that the glass transition temperature of a mixture thereof with the polymer block (a-2) is from 5° C. or more, preferably from 10° C. or more lower than the glass transition temperature of the polymer block (a-1).

Here, "compatible" means that the glass transition temperature is single and "incompatible" means that a plurality of the glass transition temperatures are present.

Therefore, the compatibility with the polymer block (a-1) and the polymer block (a-2) can be known by measuring the glass transition temperature of the block copolymer (A).

Also, the glass transition temperature of the mixture of the polymer (B) and the polymer block (a-2) can be determined by measuring the glass transition temperature of a mixture of the polymer (A) and the polymer (B).

For example, when the polymer (B) is incompatible with the polymer block (a-1), the deterioration of fracture strength such as tensile strength can be prevented.

Moreover, even when the polymer (B) is incompatible with the polymer block (a-2), the deterioration of the low hysteresis loss property can be prevented, but the effect of preventing the deterioration of the low hysteresis loss property is more enhanced when the polymer (B) is compatible with the polymer block (a-2).

Furthermore, when a difference between the glass transition temperature of the polymer block (a-1) and the glass transition temperature of the mixture of the polymer (B) and the polymer block (a-2) is 5° C. or more, the deterioration of the wet skid resistance can be prevented.

Also, the glass transition temperature of the polymer (B) itself is preferably from −120 to −20° C., more preferably from −110 to −30° C.

<Filler (C)>

Silica to be contained as a filler in the rubber composition of the present invention may be sufficiently particulate one generally used as a filler but one having a primary particle diameter of 50 nm or less is preferable.

Specific examples of such silica include wet silica (hydrous silicic acid), dry silica (silicic acid anhydride), calcium silicate, aluminum silicate, and the like. These may be used either alone or as a combination of two or more thereof, but it is preferred to use wet silica that most remarkably exhibits an effect of improving anti-fractural characteristic in the resulting rubber elestomer and an effect of achiving both of the wet griping property and the low rolling resistance.

As carbon black to be contained as a filler (C) in the rubber composition of the present invention, individual grades of carbon black such as SRF, GPF, FEF, HAF, ISAF, and SAF may be used either alone or as a combination of two or more thereof. Of these, since a rubber elastic body having excellent wear resistance is obtained, HAF, ISAF, and SAF are preferable.

In the ruber composition of the present invention, the contained ratio of silica and carbon black is preferably from 10 to 120 parts by mass based on 100 parts by mass of the whole rubber component. From the viewpoint of reinforcement and an effect of improving various physical properties, from 25 to 100 parts by mass is further preferable.

When the contained ratio of silica and carbon black is excessively small, the tensile strength and the wear resistance are remarkably deteriorated. On the other hand, when the contained ratio of silica and carbon black is excessively large, the low hysteresis loss property is remarkably deteriorated.

<Crosslinking Agent>

As the crosslinking agent to be contained in the rubber composition of the present invention, sulfur is usually used.

The contained ratio of the crosslinking agent is preferably from 0.1 to 5 parts by mass, further prefeably from 0.5 to 3 parts by mass based on 100 parts by mass of the whole rubber components.

<Other Components>

In the rubber composition of the present invention, besides the individual components of the block copolymer (A), the polymer (B), the filler (C), and the crosslinking agent, silane coupling agents, softening agents such as oil, waxes, antioxidants, stearic acid (vulcanization aid and processing aid), zinc oxide, vulcanization accelerators, and the like may be contained if necessary.

Specific examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, and the like. These may be used either alone or as a combination of two or more thereof.

In the rubber composition of the present invention, in view of an effect of improving reinforcement and the like, it is preferable to use bis(3-triethoxysilylpropyl) polysulfide or 3-trimethoxysilylpropylbenzothiazolyl tetrasulfide.

Although the contained ratio of such a silane coupling agent varies depending on the kind of the silane coupling agent, it is preferably from 1 to 20 parts by mass, further preferably from 3 to 15 parts by mass based on 100 parts by mass of silica.

When the contained ratio of the silane coupling agent is exceedingly small, there is a possibility that the effect as the silane coupling agent is not sufficiently exhibited. On the other hand, when the contained ratio of the silane coupling agent is exceedingly large, there is a possibility that the rubber component tends to be gelled.

Moreover, the contained ratio of stearic acid to be used as a vulcanization aid and a processing aid is usually from 0.5 to 5 parts by mass based on 100 parts by mass of the whole rubber component.

Furthermore, although the vulcanization accelerator is not particularly limited, it is preferable that a thiazole-based vulcanization accelerator such as M (2-mercaptobenzothiazole), DM (dibenzothiazyl disulfide), or CZ (N-cyclohexyl-2-benzothiazylsulfeneamide) is suitably used. The contained ratio of the vulcanization accelerator is usually from 0.1 to 5 parts by mass, preferably from 0.4 to 4 parts by mass based on 100 parts by mass of the conjugated diene rubber.

<Rubber Composition>

The rubber composition of the present invention can be prepared by kneading the above individual components with using a kneader such as plastomill, Banbury mixer, a roll, or an internal mixer. Specifically, it is preferable that, of the above individual components, components other than the crosslinking agent and the vulcanization accelerator are kneaded and thereafter the crosslinking agent and the vulcanization accelerator are added and further kneaded.

According to the rubber composition of the present invention, since it contains the block copolymer (A) and the polymer (B) as rubber components, even when any of silica and carbon black is used as a filler, a rubber elastic body having both of excellent low rolling resistance and wet skid resistance and also having excellent mechanical strength and wear resistance can be obtained.

Therefore, the rubber composition of the present invention is suitable as a rubber composition for obtaining a tread for tires such as fuel-saving tires, large-sized tires, and high performance tires and a side-wall member.

<Rubber Elastic Body and Tire>

The rubber elastic body of the present invention is obtained by subjecting the above rubber composition to a crosslinking treatment, and the tire of the present invention has a tread comprising the rubber elastic body obtained by subjecting the above rubber composition to a crosslinking treatment.

The tire of the present invention is produced by a usual method with using the above rubber composition.

Namely, for example, the rubber composition (unvulcanized rubber composition) of the present invention is extruded according to the shape of the tire to be formed (specifically, the shape of the tread) and molded on a tire molding machine by a usual method, by which an uncrosslinked molded body for tires is produced. This uncrosslinked molded body for tires is heated and pressurized in a vulcanizing machine, by which a tread is produced. By assembling the tread with the other parts, an objective tire can be produced.

Since the tire of the present invention has the tread obtained from the above rubber composition, the tire is excellent in both of the low rolling resistance and the wet skid resistance and also excellent in mechanical strength and wear resistance.

EXAMPLES

Although the present invention based on examples is specifically explained based on Examples, the present invention is not construed as being limited to these examples. Also, measuring methods of various physical property values are shown below.

(1) The Contained Ratio (Hereinafter also Referred to as the "Bound Styrene Content") of Structural Units Derived from an Aromatic Vinyl Compound (Styrene) in the Block Copolymer (A):

It was determined by 500 MHz $^1$H-NMR. Moreover, the bound styrene content of the polymer block (a-2) was calculated by backcalculation from the bound styrene content of the whole block copolymer (A) and the bound styrene content of the polymer block (a-1).

(2) The Content (Hereinafter also Referred to as the "Vinyl Bond Content") of 1,2-Vinyl Bonds in a Structural Unit Derived from a Conjugated Diene Compound in the Block Copolymer (A):

It was determined by 500 MHz $^1$H-NMR. Moreover, the vinyl bond content of the polymer block (a-2) was calculated by backcalculation from the vinyl bond content of the whole block copolymer (A) and the vinyl bond content of the polymer block (a-1).

(3) Glass Transition Temperature:

Measurement was carried out in accordance with ASTM D3418.

(4) Weight Average Molecular Weight:

It was determined from the retention time corresponding to the maximum peak height of a GPC curve obtained with using gel permeation chromatography (GPC) (HLC-8120GPC" (trade name (manufactured by Tosoh Corporation)) in terms of polystyrene. Moreover, the weight average molecular weight of the polymer block (a-2) was calculated by backcalculation from the weight average molecular weight of the whole block copolymer (A) and the weight average molecular weight of the polymer block (a-1).

(GPC Conditions)

Column: Trade name "GMHHXL" (manufactured by Tosoh Corporation), 2 columns
Column temperature: 40° C.
Mobile phase: Tetrahydrofuran
Flow rate: 1.0 ml/minute
Sample concentration: 10 mg/20 ml (5) Compatibility Between Polymers:

The compatibility between the polymers was judged by measuring glass transition temperature in accordance with ASTM D3418.

[Synthesis of Block Copolymer (A)]

Synthetic Example 1

(1) First Polymerization Step

Into an autoclave reactor (hereinafter also simply referred to as "reactor") having an internal volume of 5 liters, in which the atmosphere was replaced with nitrogen, 2,750 g of cyclohexane, 2.80 mmol of 2,2-di(tetrahydrofuryl)propane, 112.5 g of styrene, and 262.5 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 12.5 g of styrene and 102.5 g of 1,3-butadiene were added into the reactor at 70° C. for a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane (hereinafter referred to as a "compound (1) for functional group introduction") was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer (A). The block copolymer (A) was referred to as "polymer (A1)".

The following Table 1 shows the bound styrene content, vinyl bond content, glass transition temperature, and weight average molecular weight of each of the polymer block (a-1) and the polymer block (a-2) in the resulting polymer (A1) and the bound styrene content, vinyl bond content, and weight average molecular weight of the whole polymer (A1).

Synthetic Example 2

(1) First Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 125 g of styrene, and 175 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 190 g of 1,3-butadiene was added into the reactor at 70° C. over a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer (A). The block copolymer (A) was referred to as "polymer (A2)".

The following Table 1 shows the bound styrene content, vinyl bond content, glass transition temperature, and weight average molecular weight of each of the polymer block (a-1) and the polymer block (a-2) in the resulting polymer (A2) and the bound styrene content, vinyl bond content, and weight average molecular weight of the whole polymer (A2).

Synthetic Example 3

(1) First Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 75 g of styrene, and 125 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 50 g of styrene and 240 g of 1,3-butadiene were added into the reactor at 70° C. over a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer (A). The block copolymer (A) was referred to as "polymer (A3)".

The following Table 1 shows the bound styrene content, vinyl bond content, glass transition temperature, and weight average molecular weight of each of the polymer block (a-1) and the polymer block (a-2) in the resulting polymer (A3) and the bound styrene content, vinyl bond content, and weight average molecular weight of the whole polymer (A3).

Synthetic Example 4

(1) First Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 150 g of styrene, and 150 g of 1,3-butadiene were charged. After adjusting the temperature in the reactor adjusted to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 20 g of styrene and 170 g of 1,3-butadiene were added into the reactor at 70° C. for a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer (A). The block copolymer (A) was referred to as "polymer (A4)".

The following Table 1 shows the bound styrene content, vinyl bond content, glass transition temperature, and weight average molecular weight of each of the polymer block (a-1) and the polymer block (a-2) in the resulting polymer (A4) and the bound styrene content, vinyl bond content, and weight average molecular weight of the whole polymer (A4).

Synthetic Example 5

A block copolymer (A) was obtained in the same manner as in Synthetic Example 2 except that a cyclohexane solution containing 4.96 mmol of 1-(3-triethoxysilylpropyl)-2,2,5,5-tetramethyl-1-aza-2,5-disilacyclopentane (hereinafter referred to as a "compound (2) for functional group introduction") was used instead of the cyclohexane solution containing 4.96 mmol of the compound (1) for functional group introduction. The block copolymer (A) was referred to as "polymer (A5)".

The following Table 1 shows the bound styrene content, vinyl bond content, glass transition temperature, and weight average molecular weight of each of the polymer block (a-1) and the polymer block (a-2) in the resulting polymer (A5) and the bound styrene content, vinyl bond content, and weight average molecular weight of the whole polymer (A5).

Synthetic Example 6

A block copolymer (A) was obtained in the same manner as in Synthetic Example 2 except that a cyclohexane solution containing 4.96 mmol of 3-(4-trimethylsilyl-1-piperazino)propyltriethoxysilane (hereinafter referred to as a "compound (3) for functional group introduction") was used instead of the cyclohexane solution containing 4.96 mmol of the compound (1) for functional group introduction. The block copolymer (A) was referred to as "polymer (A6)".

The following Table 1 shows the bound styrene content, vinyl bond content, glass transition temperature, and weight average molecular weight of each of the polymer block (a-1) and the polymer block (a-2) in the resulting polymer (A6)

and the bound styrene content, vinyl bond content, and weight average molecular weight of the whole polymer (A6).

Synthetic Example 7

(1) First Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 125 g of styrene, and 175 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 190 g of 1,3-butadiene was added into the reactor at 70° C. for a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes.

(4) Onium Salt Formation Step

After adding a cyclohexane solution containing 3.71 mmol of silicon tetrachloride to a polymer solution after the reaction and mixed for 5 minutes, 2.0 g of 2,6-di-tert-butyl-p-cresol was further added tehreto. Thereafter, solvent removal was performed by steam stripping with using hot water and then, a drying treatment was performed with a hot roll controlled to 110° C. to obtain a block copolymer (A). The block copolymer (A) was referred to as "polymer (A7)".

The following Table 1 shows the bound styrene content, vinyl bond content, glass transition temperature, and weight average molecular weight of each of the polymer block (a-1) and the polymer block (a-2) in the resulting polymer (A7) and the bound styrene content, vinyl bond content, and weight average molecular weight of the whole polymer (A7).

Synthetic Example 8

A block copolymer (A) was obtained in the same manner as in Synthetic Example 7 except that a cyclohexane solution containing 4.96 mmol of 1-(3-triethoxysilylpropyl)-2,2,5,5-tetramethyl-1-aza-2,5-disilacyclopentane was used instead of the cyclohexane solution containing 4.96 mmol of N,N-bis(triethylsilyl)aminopropylmethyldimethoxysilane. The block copolymer (A) was referred to as "polymer (A8)". The following Table 1 shows the bound styrene content, vinyl bond content, glass transition temperature, and weight average molecular weight of each of the polymer block (a-1) and the polymer block (a-2) in the resulting polymer (A8) and the bound styrene content, vinyl bond content, and weight average molecular weight of the whole polymer (A8).

Synthetic Example 9

(1) First Polymerization Step

Into an autoclave reactor having an internal volume of 5 liters, in which the atmosphere was replaced with nitrogen, 2,750 g of cyclohexane, 2.46 mmol of 2,2-di(tetrahydrofuryl)propane, 200 g of styrene, and 200 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block (a-1).

(2) Second Polymerization Step

Then, 100 g of 1,3-butadiene was added into the reactor at 70° C. for a period of 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer (A). The block copolymer (A) was referred to as "polymer (A9)".

The following Table 1 shows the bound styrene content, vinyl bond content, glass transition temperature, and weight average molecular weight of each of the polymer block (a-1) and the polymer block (a-2) in the resulting polymer (A9) and the bound styrene content, vinyl bond content, and weight average molecular weight of the whole polymer (A9).

Comparative Synthetic Example 1

(1) Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 125 g of styrene, and 365 g of 1,3-butadiene were charged. After adjusting the temperature in the reactor to 10° C., a cyclohexane solution containing 4.92 mmol of n-butyllithium was added thereto to conduct polymerization. Polymerization was carried out under an adiabatic condition, and maximum temperature reached 85° C.

After reaching the polymerization conversion rate 99%, 10 g of 1,3-butadiene was added into the reactor and polymerization was further conducted for 5 minutes. Thereafter, 10 g of an unmodified polymer solution was sampled from the resulting unmodified polymer solution as a solution for measuring the molecular weight and micro structure.

(2) Polymer Termination Step

Then, a cyclohexane solution containing 4.96 mmol of 2-ethylhexanol was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a random copolymer having no functional group. The random copolymer was referred to as "polymer (X1)".

The following Table 2 shows the bound styrene content, vinyl bond content, and weight average molecular weight of the resulting polymer (X1).

Comparative Synthetic Example 2

A block copolymer having no functional group was obtained in the same manner as in Synthetic Example 2 except that a cyclohexane solution containing 4.96 mmol of 2-ethylhexanol was used as a polymerization terminator instead of the cyclohexane solution containing 4.96 mmol of N,N-bis(triethylsilyl)aminopropylmethyldimethoxysilane. The block copolymer having no functional group was referred to as "polymer (X2)".

The following Table 2 shows the bound styrene content, vinyl bond content, glass transition temperature, and weight average molecular weight of each of the polymer blocks in the resulting polymer (X2) and the bound styrene content, vinyl bond content, and weight average molecular weight of the whole polymer (X2).

Comparative Synthetic Example 3

A random copolymer having a functional group was obtained in the same manner as in Comparative Synthetic Example 1 except that a cyclohexane solution containing 4.96 mmol of N,N-bis(triethylsilyl)aminopropylmethyldimethoxysilane was used as a polymerization terminator instead of the cyclohexane solution containing 4.96 mmol of 2-ethylhexanol. The block copolymer having no functional group was referred to as "polymer (X3)".

The following Table 2 shows the bound styrene content, vinyl bond content, and weight average molecular weight of the resulting polymer (X3).

Comparative Synthetic Example 4

(1) Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 125 g of styrene, and 175 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

(2) Polymer Termination Step

After reaching the polymerization conversion rate 99%, a cyclohexane solution containing 4.96 mmol of 2-ethylhexanol was added as a polymerization terminator into the reactor, followed by reaction for 15 minutes. Then, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a random copolymer having no functional group. The random copolymer was referred to as "polymer (X4)".

The following Table 2 shows the bound styrene content, vinyl bond content, and weight average molecular weight of the resulting polymer (X4).

Comparative Synthetic Example 5

(1) Polymerization Step

Into an autoclave reactor having an internal volume of 5 liters, in which the atmosphere was replaced with nitrogen, 2.80 mmol of 2,2-di(tetrahydrofuryl)propane, and 190 g of 1,3-butadiene were charged 2,750 g of cyclohexane. After adjustin the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of 1,3-butadiene was added into the reactor and polymerization was further conducted for 5 minutes. Thereafter, 10 g of an unmodified polymer solution was sampled from the resulting unmodified polymer solution as a solution for measuring the molecular weight and micro structure.

(2) Polymer Termination Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a 1,3-butadiene polymer having a functional group. The polymer was referred to as "polymer (X5)".

The following Table 2 shows the bound styrene content, vinyl bond content, and weight average molecular weight of the resulting polymer (X5).

Comparative Synthetic Example 6

(1) First Polymerization Step

Into an autoclave reactor having an internal volume of 5 liters, in which the atmosphere was replaced with nitrogen, 2,750 g of cyclohexane, 2.80 mmol of 2,2-di(tetrahydrofuryl)propane, 125 g of styrene, and 175 g of 1,3-butadiene were charged. After adjusting the temperature in the reactor to 35° C., a cyclohexane solution containing 4.92 mmol of n-butyllithium was added thereto to conduct polymerization. At the time when polymerization temperature reached 70° C., the reactor was cooled and the temperature in the reactor was maintained at 70° C.

After reaching the polymerization conversion rate 99%, 10 g of a prepolymer solution was sampled from the resulting prepolymer solution as a solution for measuring the molecular weight and micro structure of the polymer block.

(2) Second Polymerization Step

Then, 50 g of styrene and 140 g of 1,3-butadiene were added into the reactor at 70° C. over a period for 40 minutes. After reaching the polymerization conversion rate 99%, 10 g of 1,3-butadiene was further added into the reactor and polymerization was further conducted for 5 minutes. Thereafter, 10 g of an unmodified polymer solution was sampled from the resulting unmodified polymer solution as a solution for measuring the molecular weight and micro structure.

(3) Polymer Modification Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a block copolymer having a functional group. The block copolymer was referred to as "polymer (X6)".

The following Table 2 shows the bound styrene content, vinyl bond content, glass transition temperature, and weight average molecular weight of each of polymer blocks in the resulting polymer (X6) and the bound styrene content, vinyl bond content, and weight average molecular weight of the whole polymer (X6).

Comparative Synthetic Example 7

(1) Polymerization Step

Into an autoclave reactor having an internal volume of 5 liters, in which the atmosphere was replaced with nitrogen, 2,750 g of cyclohexane, 2.46 mmol of 2,2-di(tetrahydrofuryl)propane, 200 g of styrene, and 290 g of 1,3-butadiene were charged. After adjusting the temperature in the reactor to 10° C., a cyclohexane solution containing 4.92 mmol of n-butyllithium was added thereto to conduct polymerization. Polymerization was carried out under an adiabatic condition, and maximum temperature reached 85° C.

After reaching the polymerization conversion rate 99%, 10 g of 1,3-butadiene was added into the reactor and polymerization was further conducted for 5 minutes. Thereafter, 10 g of an unmodified polymer solution was sampled from the resulting unmodified polymer solution as a solution for measuring the molecular weight and micro structure.

(2) Polymer Termination Step

Then, a cyclohexane solution containing 4.96 mmol of N,N-bis(triethylsilyl)aminopropylmethyldimethoxysilane was added as a polymerization terminator into the reactor, followed by reaction for 15 minutes. Subsequently, 2.0 g of 2,6-di-tert-butyl-p-cresol was added to a polymer solution after the reaction. Thereafter, solvent removal was performed by steam stripping with using hot water and then, a drying treatment was performed with a hot roll controlled to 110° C. to obtain a random copolymer having a functional group. The random copolymer was referred to as "polymer (X7)".

The following Table 2 shows the bound styrene content, vinyl bond content, and weight average molecular weight of the resulting polymer (X7).

Comparative Synthetic Example 8

A random copolymer was obtained in the same manner as in Comparative Synthetic Example 1 except that a cyclohexane solution containing 4.96 mmol of N-methylpyrrolidone was used as a polymerization terminator instead of the cyclohexane solution containing 4.96 mmol of 2-ethylhexanol. The random copolymer was referred to as "polymer (X8)".

The following Table 2 shows the bound styrene content, vinyl bond content, and weight average molecular weight of the resulting polymer (X8).

Comparative Synthetic Example 9

A block copolymer was obtained in the same manner as in Synthetic Example 2 except that 4.96 mmol of N-methylpyrrolidone was used as a polymerization terminator instead of the cyclohexane solution containing 4.96 mmol of N,N-bis(triethylsilyl)aminopropylmethyldimethoxysilane. The block copolymer was referred to as "polymer (X9)".

The following Table 2 shows the bound styrene content, vinyl bond content, glass transition temperature, and weight average molecular weight of each of polymer blocks in the resulting polymer (X9) and the bound styrene content, vinyl bond content, and weight average molecular weight of the whole polymer (X9).

TABLE 1

| | | Synthetic Example | | | | | | | | |
|---|---|---|---|---|---|---|---|---|---|---|
| | | 1 | 2 | 3 | 4 | 5 | 6 | 7 | 8 | 9 |
| Polymer | | A1 | A2 | A3 | A4 | A5 | A6 | A7 | A8 | A9 |
| First polymerization step | Styrene (g) | 112.5 | 125 | 75 | 150 | 125 | 125 | 125 | 125 | 200 |
| | 1,3-Butadiene (g) | 262.5 | 175 | 125 | 150 | 175 | 175 | 175 | 175 | 200 |
| Second polymerization step | Styrene (g) | 12.5 | — | 50 | 20 | — | — | — | — | — |
| | 1,3-Butadiene (g) | 102.5 | 190 | 240 | 170 | 190 | 190 | 190 | 190 | 100 |
| | 1,3-Butadiene (additional) (g) | 10 | 10 | 10 | 10 | 10 | 10 | 10 | 10 | 10 |
| Polymerization Terminator | Compound (1) for functional group introduction (mmol) | 4.96 | 4.96 | 4.96 | 4.96 | — | — | 4.96 | — | 4.96 |
| | Compound (2) for functional group introduction (mmol) | — | — | — | — | 4.96 | — | — | 4.96 | — |
| | Compound (3) for functional group introduction (mmol) | — | — | — | — | — | 4.96 | — | — | — |
| Onium-forming agent | Silicon tetrachloride (mmol) | — | — | — | — | — | — | 3.71 | 3.71 | — |
| Polymer block (a-1) | Bound styrene content (% by mass) | 30 | 40 | 37 | 48 | 40 | 40 | 40 | 40 | 50 |
| | Vinyl bond content (mol %) | 57 | 57 | 57 | 57 | 57 | 57 | 57 | 57 | 38 |
| | Glass transition temperature (° C.) | −19 | 1 | −5 | 17 | 1 | 1 | 1 | 1 | 2 |
| | Weight average molecular weight (×$10^4$) | 15 | 12 | 8 | 13 | 12 | 11 | 12 | 12 | 15 |
| Polymer block (a-2) | Bound styrene content (% by mass) | 11 | 0 | 15 | 13 | 0 | 0 | 0 | 0 | 0 |
| | Vinyl bond content (mol %) | 50 | 52 | 53 | 53 | 52 | 52 | 52 | 52 | 36 |
| | Glass transition temperature (° C.) | −48 | −68 | −37 | −41 | −68 | −68 | −68 | −68 | −84 |
| | Weight average molecular weight (×$10^4$) | 4 | 8 | 15 | 8 | 8 | 8 | 8 | 8 | 4 |

TABLE 1-continued

|  |  | Synthetic Example | | | | | | | | |
|---|---|---|---|---|---|---|---|---|---|---|
|  |  | 1 | 2 | 3 | 4 | 5 | 6 | 7 | 8 | 9 |
| Whole polymer | Bound styrene content (% by mass) | 26 | 24 | 23 | 35 | 24 | 23 | 24 | 24 | 39 |
|  | Vinyl bond content (mol %) | 56 | 55 | 54 | 55 | 55 | 55 | 55 | 55 | 38 |
|  | Weight average molecular weight ($\times 10^4$) | 19 | 20 | 23 | 21 | 20 | 19 | 20 | 20 | 19 |

TABLE 2

|  |  | Comparative Synthetic Example | | | | | | | | |
|---|---|---|---|---|---|---|---|---|---|---|
|  |  | 1 | 2 | 3 | 4 | 5 | 6 | 7 | 8 | 9 |
| Polymer |  | X1 | X2 | X3 | X4 | X5 | X6 | X7 | X8 | X9 |
| First polymerization step or polymerization step | Styrene (g) | 125 | 125 | 125 | 125 | — | 125 | 200 | 125 | 125 |
|  | 1,3-Butadiene (g) | 365 | 175 | 365 | 175 | 190 | 175 | 290 | 365 | 175 |
|  | 1,3-Butadiene (additional) | 10 | — | 10 | — | 10 | — | 10 | 10 | — |
| Second polymerization step | Styrene (g) | — | — | — | — | — | 50 | — | — | — |
|  | 1,3-Butadiene (g) | — | 190 | — | — | — | 140 | — | — | 190 |
|  | 1,3-Butadiene (additional) (g) | — | 10 | — | — | — | 10 | — | — | 10 |
| Polymerization terminator | Compound (1) for functional group introduction (mmol) | — | — | 4.96 | — | 4.96 | 4.96 | 4.96 | — | — |
|  | N-Methylpyrrolidone (mmol) | — | — | — | — | — | — | — | 4.96 | 4.96 |
|  | 2-Ethylhexanol (mmol) | 4.96 | 4.96 | — | 4.96 | — | — | — | — | — |
| Polymer block 1 | Bound styrene content (% by mass) | — | 40 | — | — | — | 45 | — | — | 40 |
|  | Vinyl bond content (mol %) | — | 57 | — | — | — | 55 | — | — | 57 |
|  | Glass transition temperature (° C.) | — | 1 | — | — | — | 9 | — | — | 1 |
|  | Weight average molecular weight ($\times 10^4$) | — | 12 | — | — | — | 11 | — | — | 11 |
| Polymer block 2 | Bound styrene content (% by mass) | — | 0 | — | — | — | 23 | — | — | 0 |
|  | Vinyl bond content (mol %) | — | 52 | — | — | — | 50 | — | — | 52 |
|  | Glass transition temperature (° C.) | — | −68 | — | — | — | −24 | — | — | −68 |
|  | Weight average molecular weight ($\times 10^4$) | — | 8 | — | — | — | 8 | — | — | 8 |
| Whole polymer | Bound styrene content (% by mass) | 26 | 24 | 23 | 40 | 0 | 36 | 40 | 25 | 23 |
|  | Vinyl bond content (mol %) | 56 | 55 | 54 | 57 | 52 | 53 | 38 | 55 | 55 |
|  | Glass transition temperature (° C.) | −28 | — | −35 | 1 | −68 | — | −17 | −31 | — |
|  | Weight average molecular weight ($\times 10^4$) | 19 | 20 | 23 | 20 | 20 | 19 | 20 | 20 | 19 |

Example 1

With using a plastomill (internal volume: 250 cc) equipped with a temperature controller, a rubber composition was prepared as described below.

Fifty parts by mass of the polymer (A1) as a block copolymer (A), 50 parts by mass of isoprene rubber "IR2200" (manufactured by JSR Corporation, glass transition temperature: −65° C.) as a polymer (B), 10 parts by mass of an extender oil "SNH46" (manufactured by Sankyo Yuka Kogyo K.K.), 55 parts by mass of silica "Nipsil AQ" (manufactured by Tosoh Silica Corporation, primary average particle diameter: 15 nm), 5.0 parts by mass of a silane coupling agent "Si69" (manufactured by Evonik Industries), 2.0 parts by mass of stearic acid, 1.0 parts by mass of an antioxidant "Nocrac 810NA" (manufactured by Ouchi Shinko Chemical Industrial Co., Ltd.), and 3.0 parts by mass of zinc oxide were kneaded under kneading conditions of a filling rate of 72%, a rotation number of 60 rpm, and a temperature of 120° C. for 3.5 minutes.

Then, a kneaded material obtained was cooled to room temperature, and thereafter, 1.8 mass of a vulcanization accelerator "Nocceler CZ" (manufactured by Ouchi Shinko Chemical Industrial Co., Ltd.), 1.5 parts by mass of a vulcanization accelerator "Nocceler D" (manufactured by Ouchi Shinko Chemical Industrial Co., Ltd.), and 1.5 parts by mass of sulfur were added to the kneaded material, followed by kneading under conditions of a rotation number of 60 rpm and 80° C. for 1.5 minutes to obtain a rubber composition.

The following Table 3 shows the glass transition temperature of a mixture of the isoprene rubber and the polymer block (a-2) in the polymer (A1) and the compatibility of the polymer (A1) with the isoprene rubber.

Examples 2 to 8

Each rubber composition was produced in the same manner as in Example 1 except that each of the polymers shown in the following Table 3 was used as a block copolymer (A) instead of the polymer (A1).

The following Table 3 shows the glass transition temperature of a mixture of the isoprene rubber and the polymer block (a-2) in each polymer and the compatibility of each polymer with the isoprene rubber.

Example 9

A rubber composition was produced in the same manner as in Example 1 except that 50 parts by mass of the polymer (A9) was used as a block copolymer (A) instead of 50 parts by mass of the polymer (A1) and 50 parts by mass of butadiene rubber "BR01" (manufactured by JSR Corporation, glass transition temperature: −107° C.) was used as a polymer (B) instead of 50 parts by mass of the isoprene rubber.

The following Table 3 shows the glass transition temperature of a mixture of the butadiene rubber and the polymer block (a-2) in the polymer (A9) and the compatibility of the polymer (A9) with the butadiene rubber.

Example 10

A rubber composition was produced in the same manner as in Example 1 except that 50 parts by mass of the polymer (A2) was used as a block copolymer (A) instead of 50 parts by mass of the polymer (A1) and carbon black "DIA BLACK N339" (manufactured by Mitsubishi Chemical Corporation) was used instead of 55 parts by mass of silica.

Comparative Examples 1 to 5

Each rubber composition was produced in the same manner as in Example 1 except that each of the polymers shown in the following Table 4 was used instead of the polymer (A1).

The following Table 4 shows the compatibility of each polymer with the isoprene rubber.

Comparative Example 6

A rubber composition was produced in the same manner as in Example 1 except that the polymer (X1) was used instead of the polymer (A1) and 50 parts by mass of butadiene rubber "BR01" (manufactured by JSR Corporation) was used instead of 50 parts by mass of the isoprene rubber.

Comparative Example 7

A rubber composition was produced in the same manner as in Example 1 except that the polymer (X7) was used instead of the polymer (A1) and 50 parts by mass of butadiene rubber "BR01" (manufactured by JSR Corporation) was used instead of 50 parts by mass of the isoprene rubber.

Comparative Examples 8 to 11

Rubber compositions were produced in the same manner as in Example 1 except that the polymers shown in the following Table 4 were used instead of the polymer (A1) and carbon black "DIA BLACK N339" (manufactured by Mitsubishi Chemical Corporation) was used instead of 55 parts by mass of silica.

The following Table 4 shows the compatibility of each polymer with the isoprene rubber.

[Characteristic Evaluation]

For the rubber elastic bodies obtained in Examples 1 to 10 and Comparative Examples 1 to 11, the following evaluations were performed. The results are shown in Tables 3 and 4.

(1) Tensile Strength (300% Modulus)

Three hundred percent modulus was measured in accordance with JIS K6301, and an index at the time when the value of 300% modulus of the rubber elastic body according to Comparative Example 1 was taken as 100 was determined. When the index is larger, a rubber elastic body can be evaluated such that the tensile strength is larger and the mechanical strength is more excellent.

(2) Wet Skid Resistance (0° C. tanδ):

With using a dynamic spectrometer (manufactured by US Rheometric Inc.), measurement was carried out under conditions of a tensile dynamic distortion of 0.14%, an angular velocity of 100 radians per second, and a temperature of 0° C. An index at the time when the value of the rubber elastic body according to Comparative Example 1 is taken as 100 was determined. The larger value of the index shows the larger and better wet skid resistance.

(3) Low Hysteresis Loss Property (50° C. tanδ):

With using a dynamic spectrometer (manufactured by US Rheometric Inc.), measurement was carried out under conditions of a tensile dynamic distortion of 0.7%, an angular velocity of 100 radians per second, and a temperature of 50° C. An index at the time when the value of the rubber elastic body according to Comparative Example 1 is taken as 100 was determined. The larger value of the index shows the larger and better low hysteresis loss property.

(4) Wear Resistance:

With using a DIN wear tester (manufactured by Toyo Seiki), measurement was carried out under condition of a load of 10 N and 25° C. in accordance with JIS K6264. An index at the time when the value of the rubber elastic body according to Comparative Example 1 is taken as 100 was determined. When the index is larger, a rubber elastic body can be evaluated such that the wear resistance is more excellent.

TABLE 3

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Formulation of rubber composition | Polymer (A1) (parts by mass) | 50 | — | — | — | — | — | — | — | — | — |
|  | Polymer (A2) (parts by mass) | — | 50 | — | — | — | — | — | — | — | 50 |
|  | Polymer (A3) (parts by mass) | — | — | 50 | — | — | — | — | — | — | — |
|  | Polymer (A4) (parts by mass) | — | — | — | 50 | — | — | — | — | — | — |
|  | Polymer (A5) (parts by mass) | — | — | — | — | 50 | — | — | — | — | — |
|  | Polymer (A6) (parts by mass) | — | — | — | — | — | 50 | — | — | — | — |
|  | Polymer (A7) (parts by mass) | — | — | — | — | — | — | 50 | — | — | — |
|  | Polymer (A8) (parts by mass) | — | — | — | — | — | — | — | 50 | — | — |
|  | Polymer (A9) (parts by mass) | — | — | — | — | — | — | — | — | 50 | — |

TABLE 3-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | Isoprene rubber (parts by mass) | 50 | 50 | 50 | 50 | 50 | 50 | 50 | 50 | — | 50 |
|  | Butadiene rubber (parts by mass) | — | — | — | — | — | — | — | — | 50 | — |
|  | Silica (parts by mass) | 55 | 55 | 55 | 55 | 55 | 55 | 55 | 55 | 55 | — |
|  | Carbon black (parts by mass) | — | — | — | — | — | — | — | — | — | 55 |
|  | Extender oil (parts by mass) | 10 | 10 | 10 | 10 | 10 | 10 | 10 | 10 | 10 | 10 |
|  | Silane coupling agent (parts by mass) | 5.0 | 5.0 | 5.0 | 5.0 | 5.0 | 5.0 | 5.0 | 5.0 | 5.0 | 5.0 |
|  | Stearic acid (parts by mass) | 2.0 | 2.0 | 2.0 | 2.0 | 2.0 | 2.0 | 2.0 | 2.0 | 2.0 | 2.0 |
|  | Antioxidant (parts by mass) | 1.0 | 1.0 | 1.0 | 1.0 | 1.0 | 1.0 | 1.0 | 1.0 | 1.0 | 1.0 |
|  | Zinc oxide (parts by mass) | 3.0 | 3.0 | 3.0 | 3.0 | 3.0 | 3.0 | 3.0 | 3.0 | 3.0 | 3.0 |
|  | Vulcanization accelerator "Nocceler CZ" (parts by mass) | 1.8 | 1.8 | 1.8 | 1.8 | 1.8 | 1.8 | 1.8 | 1.8 | 1.8 | 1.8 |
|  | Vulcanization accelerator "Nocceler D" (parts by mass) | 1.5 | 1.5 | 1.5 | 1.5 | 1.5 | 1.5 | 1.5 | 1.5 | 1.5 | 1.5 |
|  | Sulfur (parts by mass) | 1.5 | 1.5 | 1.5 | 1.5 | 1.5 | 1.5 | 1.5 | 1.5 | 1.5 | 1.5 |
| Compatibility with polymer (B) | Polymer block (a-1) | Incompatible | Incompatible | Incompatible | Incompatible | Incompatible | Incompatible | Incompatible | Incompatible | Incompatible | Incompatible |
|  | Polymer block (a-2) | Compatible | Compatible | Compatible | Compatible | Compatible | Compatible | Compatible | Compatible | Compatible | Compatible |
| Glass transition temperature of mixture of polymer (B) and polymer block (a-2) (° C.) |  | −62 | −66 | −54 | −58 | −66 | −66 | −66 | −66 | −103 | −66 |
| Evaluation results | Tensile strength | 112 | 112 | 110 | 104 | 112 | 112 | 112 | 112 | 106 | 108 |
|  | Wet skid resistance (0° C. tanδ) | 147 | 195 | 159 | 333 | 195 | 195 | 195 | 195 | 195 | 198 |
|  | Low hysteresis loss property (50° C. tanδ) | 130 | 140 | 142 | 127 | 140 | 140 | 140 | 140 | 119 | 158 |
|  | Wear resistance | 121 | 119 | 117 | 131 | 119 | 119 | 119 | 119 | 127 | 109 |

TABLE 4

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| Formulation of rubber composition | Polymer (X1) (parts by mass) | 50 | — | — | — | — | 50 | — | 50 | — | — | — |
|  | Polymer (X2) (parts by mass) | — | 50 | — | — | — | — | — | — | — | — | — |
|  | Polymer (X3) (parts by mass) | — | — | 50 | — | — | — | — | — | 50 | — | — |
|  | Polymer (X4) (parts by mass) | — | — | — | 25 | — | — | — | — | — | — | — |
|  | Polymer (X5) (parts by mass) | — | — | — | 25 | — | — | — | — | — | — | — |
|  | Polymer (X6) (parts by mass) | — | — | — | — | 50 | — | — | — | — | — | — |
|  | Polymer (X7) (parts by mass) | — | — | — | — | — | — | 50 | — | — | — | — |
|  | Polymer (X8) (parts by mass) | — | — | — | — | — | — | — | — | — | 50 | — |
|  | Polymer (X9) (parts by mass) | — | — | — | — | — | — | — | — | — | — | 50 |
|  | Isoprene rubber (parts by mass) | 50 | 50 | 50 | 50 | 50 | — | — | 50 | 50 | 50 | 50 |
|  | Butadiene rubber (parts by mass) | — | — | — | — | — | 50 | 50 | — | — | — | — |
|  | Silica (parts by mass) | 55 | 55 | 55 | 55 | 55 | 55 | 55 | — | — | — | — |
|  | Carbon black (parts by mass) | — | — | — | — | — | — | — | 55 | 55 | 55 | 55 |
|  | Extender oil (parts by mass) | 10 | 10 | 10 | 10 | 10 | 10 | 10 | 10 | 10 | 10 | 10 |
|  | Silane coupling agent (parts by mass) | 5.0 | 5.0 | 5.0 | 5.0 | 5.0 | 5.0 | 5.0 | 5.0 | 5.0 | 5.0 | 5.0 |
|  | Stearic acid (parts by mass) | 2.0 | 2.0 | 2.0 | 2.0 | 2.0 | 2.0 | 2.0 | 2.0 | 2.0 | 2.0 | 2.0 |
|  | Antioxidant (parts by mass) | 1.0 | 1.0 | 1.0 | 1.0 | 1.0 | 1.0 | 1.0 | 1.0 | 1.0 | 1.0 | 1.0 |
|  | Zinc oxide (parts by mass) | 3.0 | 3.0 | 3.0 | 3.0 | 3.0 | 3.0 | 3.0 | 3.0 | 3.0 | 3.0 | 3.0 |
|  | Vulcanization accelerator "Nocceler CZ" (parts by mass) | 1.8 | 1.8 | 1.8 | 1.8 | 1.8 | 1.8 | 1.8 | 1.8 | 1.8 | 1.8 | 1.8 |
|  | Vulcanization accelerator "Nocceler D" (parts by mass) | 1.5 | 1.5 | 1.5 | 1.5 | 1.5 | 1.5 | 1.5 | 1.5 | 1.5 | 1.5 | 1.5 |
|  | Sulfur (parts by mass) | 1.5 | 1.5 | 1.5 | 1.5 | 1.5 | 1.5 | 1.5 | 1.5 | 1.5 | 1.5 | 1.5 |
| Compatibility with polymer (B) | Polymer block (a-1) | — | Incompatible | — | — | Incompatible | — | — | — | — | — | incompatible |
|  | Polymer block (a-2) | — | Compatible | — | — | Incompatible | — | — | — | — | — | compatible |

TABLE 4-continued

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Glass transition temperature of mixture of polymer (B) and polymer block (a-2) (° C.) | — | −66 | — | — | −65/−24 | — | — | — | — | — | −66 |
| Evaluation results Tensile strength | 100 | 95 | 110 | 107 | 102 | 100 | 104 | 100 | 106 | 102 | 103 |
| Wet skid resistance (0° C. tanδ) | 100 | 90 | 130 | 185 | 260 | 100 | 180 | 100 | 125 | 106 | 126 |
| Low hysteresis loss property (50° C. tanδ) | 100 | 99 | 120 | 107 | 103 | 100 | 108 | 100 | 143 | 110 | 112 |
| Wear resistance | 100 | 99 | 115 | 108 | 125 | 100 | 121 | 100 | 107 | 102 | 103 |

As apparent from Tables 3 and 4, in the rubber compositions according to Examples 1 to 10, it was confirmed that rubber elastic bodies having both of excellent low rolling resistance and wet skid resistance and also having excellent mechanical strength and wear resistance were obtained.

Also, from the comparison of the physical property evaluation results between the rubber elastic body according to Example 2 and the rubber elastic body according to Comparative Example 3, it is understood that the use of the block copolymer (A) comprising the polymer block (a-1) and the polymer block (a-2), in which the polymer block (a-2) has a functional group, as a rubber component is very important for improving a balance between the wet skid resistance and the low hysteresis loss property.

The invention claimed is:

1. A rubber composition, comprising:
   (i) a block copolymer (A) comprising:
      a polymer block (a-1) comprising a structural unit derived from a conjugate diene compound and a structural unit derived from an aromatic vinyl compound, and
      a polymer block (a-2) comprising a structural unit derived from a conjugate diene compound or a structural unit derived from a conjugate diene compound and a structural unit derived from an aromatic vinyl compound;
   (ii) at least one polymer (B) selected from the group consisting of natural rubber, isoprene rubber, butadiene rubber, a styrene-butadiene rubber other than the block copolymer (A), an ethylene-α-olefin copolymer rubber, an ethylene-α-olefin-diene copolymer rubber, an acrylonitrile-butadiene copolymer rubber, chloroprene rubber, and a halogenated butyl rubber; and
   (iii) at least one filler (C) selected from the group consisting of silica and carbon black,
   wherein:
   a glass transition temperature of the polymer block (a-2) is lower than a glass transition temperature of the polymer block (a-1) in the block copolymer (A);
   the block copolymer (A) comprises at least one functional group selected from the group consisting of an amino group, an imino group, a pyridyl group, a piperazyl group, and a thiol group, or a functional group obtained by subjecting each of these functional groups to onium salt formation, and at least one functional group selected from the group consisting of a hydrocarbyloxysilyl group and a silanol group in the end of the polymer block (a-2) side;
   the block copolymer (A) has two glass transition temperatures separated from each other by 5° C. or more within a range of −100 to 20° C. by a measurement in accordance with ASTM D3418; and
   a fraction of the block copolymer (A) is 10% by mass or more when a sum of the block copolymer (A) and the polymer (B) is taken as 100% by mass.

2. The rubber conmposition according to claim 1, wherein, of the two glass transition temperatures in the block copolymer (A), one is a glass transition temperature of the polymer block (a-1) and the other one is a glass transition temperature of the polymer block (a-2) and the glass transition temperature of the polymer block (a-1) is from −60 to 20° C. and the glass transition temperature of the polymer block (a-2) is from −100 to −30° C.

3. The rubber composition according to claim 1, wherein, in the polymer block (a-1), a fraction of the structural unit derived from an aromatic vinyl compound in the total structural units is 20% by mass or more.

4. The rubber composition according to claim 1, wherein the block copolymer (A) is obtained by, in a hydrocarbon solvent,
   subjecting a conjugated diene compound and an aromatic vinyl compound to living anionic polymerization in the presence of at least one compound selected from the group consisting of an organic alkali metal and an organic alkaline earth metal as an initiator to synthesize a prepolymer having an active end;
   subjecting a conjugated diene compound or a conjugated diene compound and an aromatic vinyl compound to living anionic polymerization with the active end of the prepolymer as a polymerization initiation point to synthesize an unmodified block copolymer having an active end; and
   reacting the active end of the unmodified block copolymer with a hydrocarbyloxysilane having at least one functional group selected from the group consisting of an amino group, an imino group, a pyridyl group, a piperazyl group, and a thiol group.

5. The rubber composition according to claim 1, wherein the block copolymer (A) is obtained by, in a hydrocarbon solvent,
   subjecting a conjugated diene compound and an aromatic vinyl compound to living anionic polymerization in the presence of at least one compound selected from the group consisting of an organic alkali metal and an organic alkaline earth metal as an initiator to synthesize a prepolymer having an active end;
   subjecting a conjugated diene compound or a conjugated diene compound and an aromatic vinyl compound to living anionic polymerization with the active end of the prepolymer as a polymerization initiation point to synthesize an unmodified block copolymer having an active end;

reacting the active end of the unmodified block copolymer with a hydrocarbyloxysilane having at least one functional group selected from the group consisting of an amino group, an imino group, a pyridyl group, a piperazyl group, and a thiol group to synthesize a modified block copolymer; and subjecting the functional group in the modified block copolymer to onium salt formation with an onium-forming agent.

6. The rubber composition according to claim 1, further comprising a crosslinking agent.

7. The rubber composition according to claim 1, wherein the polymer block (a-2) comprises a structural unit derived from a conjugate diene compound.

8. The rubber composition according to claim 1, wherein the polymer block (a-2) comprises a structural unit derived from a conjugate diene compound and a structural unit derived from an aromatic vinyl compound.

9. The rubber composition according to claim 1, wherein the filler (C) is silica.

10. The rubber composition according to claim 1, wherein the filler (C) is carbon black.

11. A rubber elastic body obtained by a crosslinking treatment of the rubber composition according to claim 6.

12. A tire having a tread formed from the rubber elastic body according to claim 11.

13. A block copolymer, comprising:
a polymer block (a-1) comprising a structural unit derived from a conjugate diene compound and a structural unit derived from an aromatic vinyl compound; and
a polymer block (a-2) comprising a structural unit derived from a conjugate diene compound or a structural unit derived from a conjugate diene compound and a structural unit derived from an aromatic vinyl compound,
wherein:
the block copolymer comprises at least one functional group selected from the group consisting of an amino group, an imino group, a pyridyl group, a piperazyl group, and a thiol group, or a functional group obtained by subjecting each of these functional groups to onium salt formation, and at least one functional group selected from the group consisting of a hydrocarbyloxysilyl group and a silanol group; and
the block copolymer has two glass transition temperatures separated from each other by 5° C. or more within a range of −100 to 20° C. in measurement with ASTM D3418.

14. The block copolymer according to claim 13, wherein, of the two glass transition temperatures, one is a transition temperature of the polymer block (a-1) and the other one is a transition temperature of the polymer block (a-2) and the transition temperature of the polymer block (a-1) is from −60 to 20° C. and the transition temperature of the polymer block (a-2) is from −100 to −30° C.

* * * * *